United States Patent
Fujita et al.

(10) Patent No.: US 10,304,642 B2
(45) Date of Patent: May 28, 2019

(54) SWITCH DEVICE COVER PERMITTING PARTIAL ACCESSIBILITY

(71) Applicant: MITSUBISHI JIDOSHA KOGYO KABUSHIKI KAISHA, Tokyo (JP)

(72) Inventors: Akihiko Fujita, Tokyo (JP); Hirokazu Sato, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/960,967

(22) Filed: Apr. 24, 2018

(65) Prior Publication Data

US 2018/0308648 A1  Oct. 25, 2018

(30) Foreign Application Priority Data

Apr. 25, 2017  (JP) .................. 2017-085820

(51) Int. Cl.
*H01H 9/28* (2006.01)
*H01H 13/04* (2006.01)
*H01H 13/14* (2006.01)
*B60R 16/00* (2006.01)

(52) U.S. Cl.
CPC ............ *H01H 13/14* (2013.01); *H01H 9/287* (2013.01); *H01H 13/04* (2013.01); *B60R 16/005* (2013.01); *H01H 2223/038* (2013.01); *H01H 2233/07* (2013.01)

(58) Field of Classification Search
CPC .. H01H 13/14; H01H 13/04; H01H 2217/022; H01H 9/287; H01H 2223/034; H01H 2223/0345; H01H 2223/036; H01H 2223/038; H01H 2223/044; H01H 2223/046; H01H 2223/05; H01H 2233/07; B60R 16/005; B60R 11/0264; B60R 21/09; B60R 2011/0005; B60R 2011/0007; B60R 25/00
See application file for complete search history.

(56) References Cited

U.S. PATENT DOCUMENTS

| 5,401,904 A * | 3/1995 | Greenier, Jr. .......... H01H 9/287 174/67 |
| 5,577,422 A * | 11/1996 | Beck .................... B60H 1/0065 16/328 |
| 5,669,484 A * | 9/1997 | Paulson ................. H01H 9/287 200/43.01 |

(Continued)

FOREIGN PATENT DOCUMENTS

JP  8-129924 A  5/1996

*Primary Examiner* — Vanessa Girardi
(74) *Attorney, Agent, or Firm* — Birch, Stewart, Kolasch & Birch, LLP (57) ABSTRACT

A switch device for a vehicle includes an emergency notification switch, an operation switch other than the emergency notification switch, and a cover that is movable between a closed position at which the emergency notification switch and the operation switch are covered and an open position at which the emergency notification switch and the operation switch are exposed. In the switch device, an operating surface of the emergency notification switch is located at a position lower than an operating surface of the operation switch, and the cover is provided with an opening through which the operating surface of the operation switch is exposed at the closed position.

7 Claims, 6 Drawing Sheets

(56) References Cited

U.S. PATENT DOCUMENTS

| | | | | |
|---|---|---|---|---|
| 7,265,306 | B2 * | 9/2007 | Radu | B60R 13/0243 |
| | | | | 200/310 |
| 10,011,220 | B1 * | 7/2018 | Gordon | B60Q 3/0243 |
| 2001/0052715 | A1 * | 12/2001 | McAndrew | B60K 37/06 |
| | | | | 296/37.13 |
| 2002/0008610 | A1 * | 1/2002 | Peterson | H01H 9/0214 |
| | | | | 340/5.64 |
| 2018/0245321 | A1 * | 8/2018 | Shimasaki | E03D 9/08 |

* cited by examiner

SWITCH DEVICE COVER PERMITTING PARTIAL ACCESSIBILITY

CROSS REFERENCE TO RELATED APPLICATION

This application is based on Japanese Patent Application No. 2017-085820 filed on Apr. 25, 2017, the contents of which are incorporated herein by reference.

BACKGROUND OF THE INVENTION

1. Technical Field

The present invention relates to a switch device for a vehicle.

2. Related Art

In some countries, it is stipulated by regulations to provide an emergency notification switch in a passenger compartment.

In those countries, when an emergency situation such as a traffic accident occurs, by operating the emergency notification switch, a call is made from a wireless telephone installed in a vehicle in advance to a call center for emergency notification, and the occupant of the vehicle talks to an attendant of the call center, so that police vehicles and ambulance vehicles are arranged according to the call from the call center.

In addition, according to the regulations, in order to prevent erroneous operation, it is also stipulated to cover an operating surface of the emergency notification switch with an openable cover.

A road service switch may be provided at a position adjacent to the emergency notification switch for making a call to a call center for a road service for example, from a wireless telephone.

In this case, when opening the cover and operating the emergency notification switch, there is a problem in that the road service switch adjacent to the emergency notification switch may be erroneously operated.

JP-A-08-129924 discloses the following structure as a technique for preventing erroneous operation of a plurality of operation switches.

That is, in order to improve the appearance, the operating surfaces of a plurality of operation switches are formed to have the same height, and all the operation switches are covered with a cover that can be opened and closed.

Further, an opening is provided in a portion of the cover corresponding to the operation switch with a high operating frequency among the plurality of operation switches, and a movable member capable of pressing the operation switch is attached to the opening.

According to this configuration, the operation switch with the high operating frequency can be operated through the movable member at the closed position of the cover. However, since the operation switch with low operating frequency is covered with the cover, an erroneous operating is prevented. Also, when operating the operation switch with the low operating frequency, the cover is opened to the open position.

However, in the above-mentioned related art, since the operating surfaces of all the operation switches are the same at the open position of the cover, when the operation switch is touched with the fingertip, each operation switch cannot be distinguished. Accordingly, it is necessary to operate with careful attention to the position of each operation switch, and if the operation switch is misjudged, there is a case of erroneous operating.

The present invention has been made in view of the above circumstances, and there is provided a switch device for a vehicle which is advantageous in improving operability, while preventing erroneous operating.

SUMMARY OF INVENTION

In order to achieve the above object, according to an aspect of the present invention, there is provided a switch device for a vehicle including an emergency notification switch, an operation switch other than the emergency notification switch, and a cover that is movable between a closed position at which the emergency notification switch and the operation switch are covered and an open position at which the emergency notification switch and the operation switch are exposed. In the switch device, an operating surface of the emergency notification switch is located at a position lower than an operating surface of the operation switch, and the cover is provided with an opening through which the operating surface of the operation switch is exposed at the closed position.

According to the aspect of the invention, at the closed position of the cover, the emergency notification switch is covered with the cover, and the operating surface of at least one operation switch except the emergency notification switch is exposed thorough from the opening.

By moving the fingertip along the cover, the user can easily reach the operating surface of the switch exposed from the opening with the fingertip.

Therefore, it is possible to reliably operate the operating surface of the operation switch, without erroneously operating the emergency notification switch covered with the cover.

Further, at the open position of the cover, since the operating surface of the emergency notification switch is located to be lower than the operating surface of the other operation switches, even in a state where the user is confused when an emergency situation such as a traffic accident occurs, by moving the fingertip on the operating surface, it is possible to reliably grasp the position of the emergency notification switch and to operate the switch, which is advantageous in improving the operability when operating the switch.

BRIEF DESCRIPTION OF DRAWINGS

FIGS. 2A and 2B are perspective views of the switch device for the vehicle according to the embodiment, wherein

FIGS. 3A and 3B are front views of the switch device for the vehicle according to the embodiment, wherein

DETAILED DESCRIPTION OF EMBODIMENTS

Hereinafter, embodiments of the present invention will be described with reference to the drawings.

In the following drawings, a reference sign "FR" indicates a front side of a vehicle, a reference sign "LH" indicates a vehicle width direction, and a reference sign "UP" indicates an upper side of the vehicle.

Figure 1:
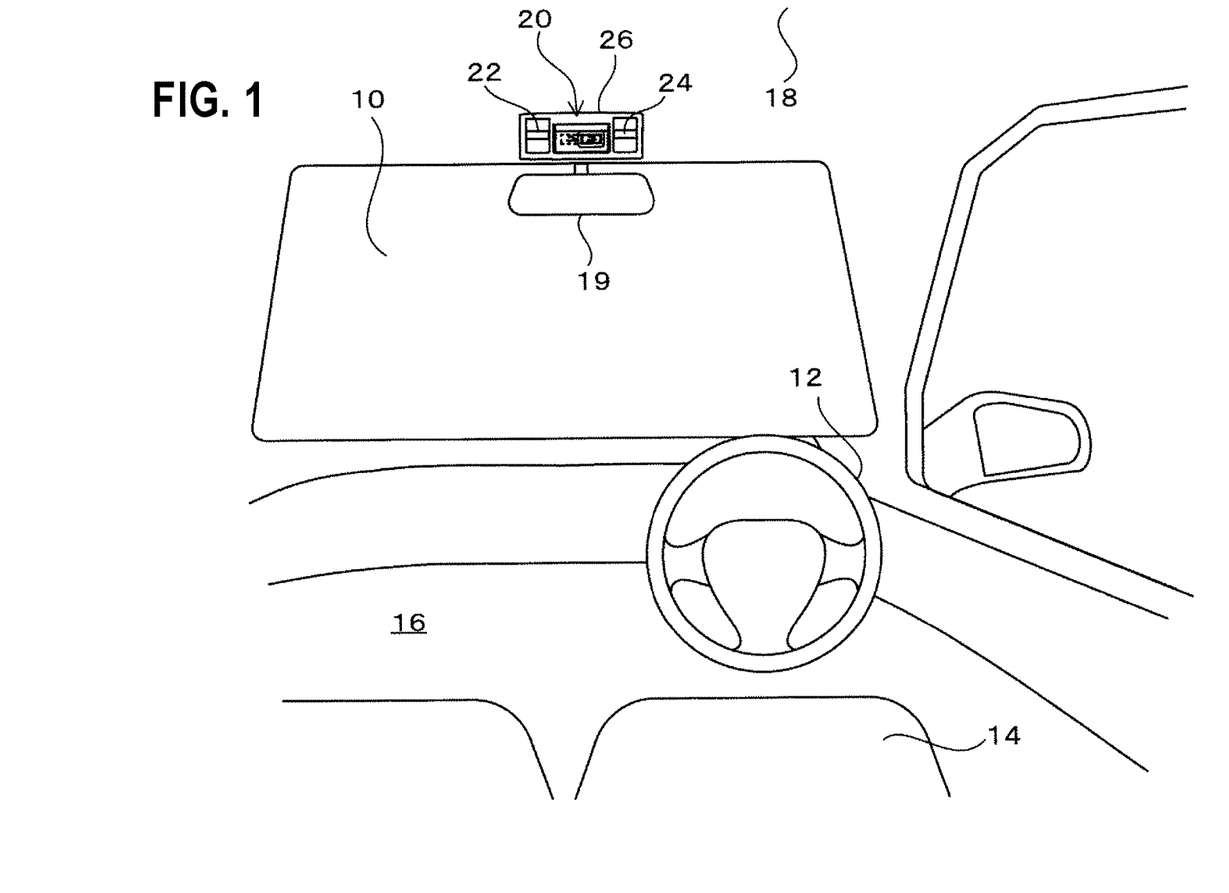
FIG. 1 is a perspective view illustrating a state in which a switch device for a vehicle according to an embodiment is disposed on a ceiling of a passenger compartment.

As illustrated in FIG. 1, a steering wheel 12 is provided in the rear side of a front windshield glass 10, and a driver's seat 14 is provided in the rear side of the steering wheel 12.

An opening (not illustrated) is provided in a ceiling 18 inside a passenger compartment 16, and the opening is opened and closed by a sunroof fixed with glass. Further, a sunshade is provided which closes the sunroof and the opening to shield light in a state in which the opening is closed with a sunroof.

A room mirror 19 is provided in the lower part from the front end of the ceiling 18 of the vehicle, and the vehicle switch device 20 of the embodiment is provided at the front end of the vehicle ceiling 18 above the room mirror 19.

Further, in the present embodiment, a sunshade opening and closing switch device 22 and a sunroof opening and closing switch device 24 are provided on both sides of the vehicle switch device 20 in the vehicle width direction.

The vehicle switch device 20, the sunshade opening and closing switch device 22, and the sunroof opening and closing switch device 24 have a common frame 26.

Figure 2A:
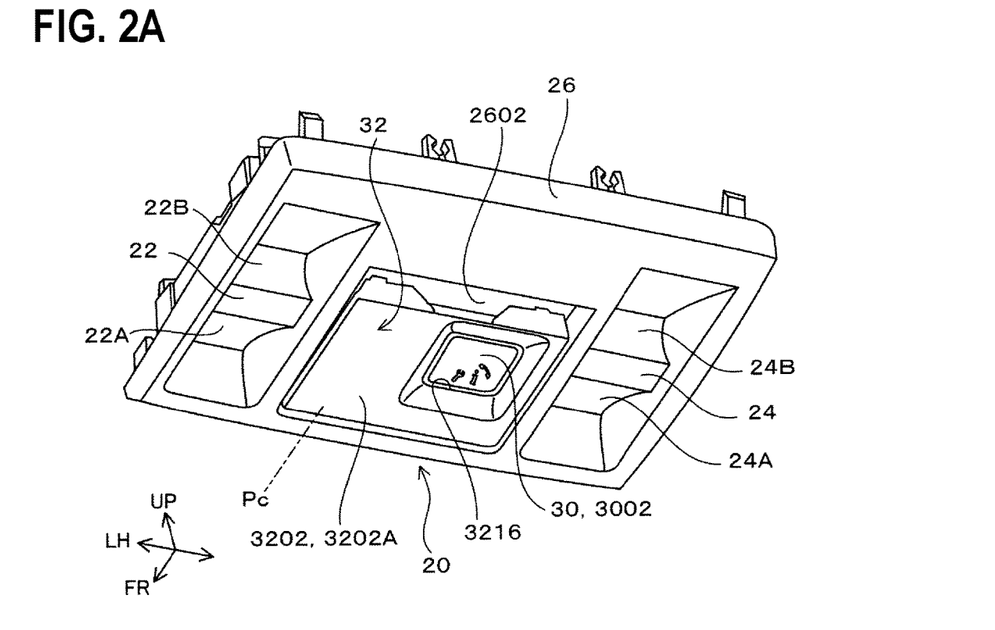
FIG. 2A illustrates a state in which a cover is located at a closed position and FIG. 2B illustrates a state in which the cover is located at an open position.

As illustrated in FIG. 2A, the sunshade opening and closing switch device 22 and the sunroof opening and closing switch device 24 are push switches that operate by pressing the operating surfaces thereof, and the switches 22 and 24 are arranged in the vehicle width direction and are incorporated in the frame 26.

The sunshade opening and closing switch device 22 and the sunroof opening and closing switch device 24 are located at an initial position before being pressed, are located at an operating position when pressed, and returns to the initial position when the pressing is released.

The sunshade opening and closing switch device 22 is provided such that the sunshade is moved to the rear part of the vehicle by pressing the operating surface 22A directed to the front part toward the rear part of the vehicle to expose the sunroof to the interior of the vehicle interior 16, and the sunshade is moved to the front part of the vehicle by pressing the operating surface 22B directed to the rear part of the vehicle, thereby closing the sunroof and the opening.

The sunroof opening and closing switch device 24 is provided such that the sunroof is moved to the rear part of the vehicle to fully open the opening by pressing the operating surface 24A directed to the front part toward the rear part of the vehicle, and the sunroof is moved to the front part of the vehicle by pressing the operating surface 24B directed to the rear part of the vehicle toward the front part of the vehicle, thereby closing the opening by the sunroof.

As illustrated in FIGS. 2A to 3B, the vehicle switch device 20 of the present invention is configured to include one emergency notification switch 28, one road service switch 30 which is an example of an operation switch, and a cover 32.

Incidentally, the emergency notification switch 28 and one road service switch 30 as an example of the operation switch are constituted by push button switches which are operated, for example, when the operating surface is pressed to the operating position.

The emergency notification switch 28 is also called an e-call switch or an emergency notification switch.

When the emergency notification switch 28 is operated in the event of an emergency such as a traffic accident or the like, a communication control unit (not illustrated) which has detected the operation of the emergency notification switch 28 controls a wireless telephone (automobile phone or mobile phone) to make a call to the call center for emergency notification. When an occupant of the vehicle communicates with an agent of the call center through a wireless telephone, a police vehicle or an ambulance vehicle is arranged from the call center.

In order to prevent erroneous operation of the emergency notification switch 28, it is regulated by the regulations that the operating surface 2802 of the emergency notification switch 28 is covered with the cover 32.

The road service switch 30 is also referred to as a b-call switch or a break down call switch.

When the road service switch 30 is operated when a failure or the like of the vehicle occurs, the communication control unit which have detected the operation of the road service switch 30 controls the wireless telephone and makes a call to the call center for the road service. When a vehicle occupant communicates with an attendant of the call center via a wireless telephone, a call center prepares a vehicle for a road service.

The emergency notification switch 28 and the road service switch 30 are arranged in the vehicle width direction and are incorporated in the frame 26 between the sunroof opening and closing switch device 24 and the sunshade opening and closing switch device 22.

The emergency notification switch 28 and the road service switch 30 are located at the initial position before being pressed and are located at the operating position when pressed, and return to the initial position when the pressing is released.

The emergency notification switch 28 and the road service switch 30 both have a columnar shape with a rectangular cross section and have rectangular flat operating surfaces 2802 and 3002.

The operating surface 2802 of the emergency notification switch 28 is formed in red, and, for example, an emergency display such as a character such as SOS or a mark of a receiver is formed.

The operating surface 3002 of the road service switch 30 is formed in black, and for example, a display corresponding to a road service such as a mark such as a wrench, an i mark, a handset mark, or the like is formed.

Further, on the inside of the emergency notification switch 28 and on the inside of the road service switch 30, light sources are arranged so that the operating surfaces 2802 and 3002 are displayed at night.

Figure 4:
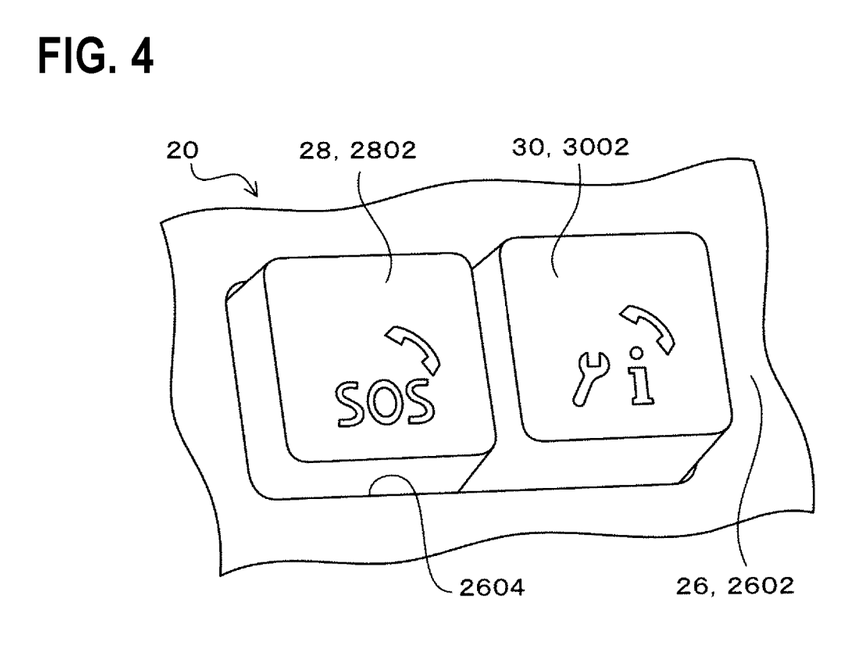
FIG. 4 is a perspective view of the switch device for the vehicle according to the embodiment.

As illustrated in FIG. 4, the frame 26 has a surface 2602 facing into the passenger compartment 16, that is, a downward facing surface 2602, and the emergency notification switch 28 and the road service switch 30 are provided to protrude downward from the opening 2604 of the surface 2602, and are disposed so that the respective operating surfaces 2802 and 3002 are directed downward.

Figure 6A:
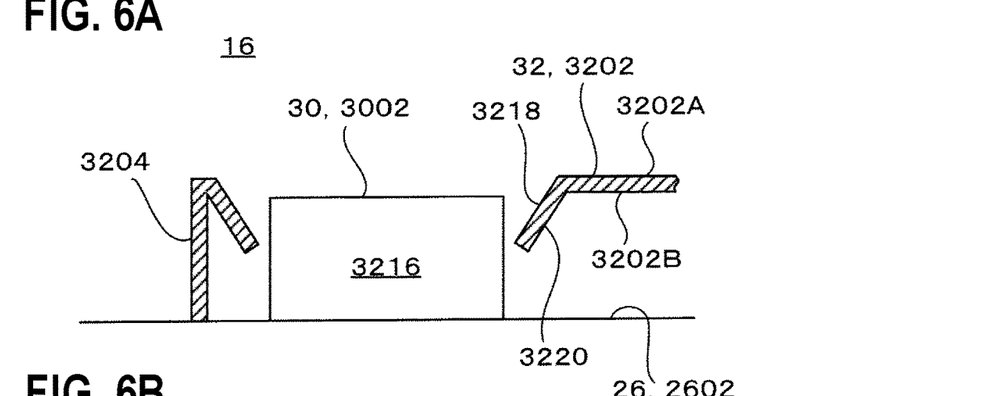
FIG. 6A is a cross-sectional view taken along the line A-A of FIG. 3A.
Figure 6B:
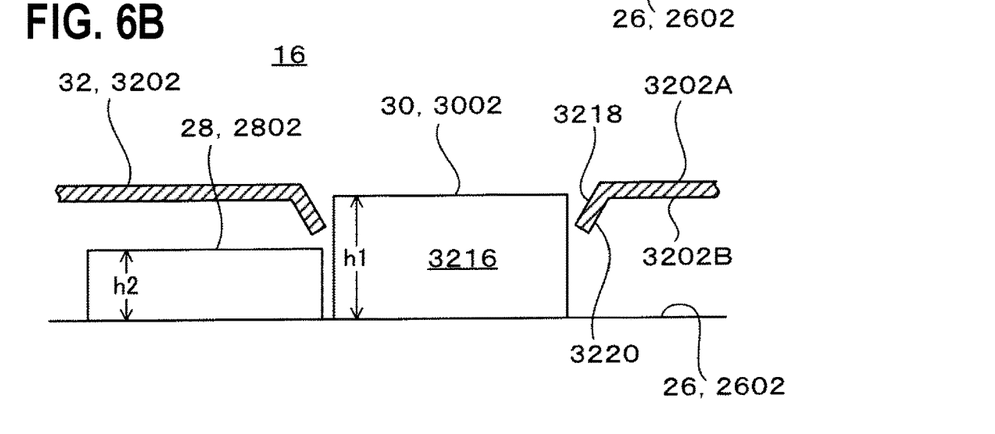
FIG. 6B is a cross-sectional view taken along line B-B of FIG. 3A.

As illustrated in FIG. 6B, at the initial position of the emergency notification switch 28 and the road service switch 30, a height h1 of the operating surface 3002 of the road service switch 30 from the surface 2602 is formed at a dimension greater than a height h2 of the operating surface 2802 of the emergency notification switch 28 from the surface 2602. In other words, the operating surface 2802 of the emergency notification switch 28 is located to be lower than the operating surface 3002 of the road service switch 30. Therefore, a step is formed between the operating surfaces 2802 and 3002.

The cover 32 covers the emergency notification switch 28 and the road service switch 30, and is provided to be openable and closable on the frame 26. More specifically, the cover 32 is swingable between a closed position Pc (FIGS. 2A and 3A) which covers the emergency notification switch 28 and the road service switch 30 and an open position Po (FIGS. 2B and 3B) which opens the emergency notification switch 28 and the road service switch 30, around a pivot shaft as described later. In addition, the cover 32 may be provided so as to be slidable with respect to the frame 26, or may be provided so as to be detachable, that is, it may be movable between the closed position Pc and the open position Po.

Figures 5A, 5B, 5C:
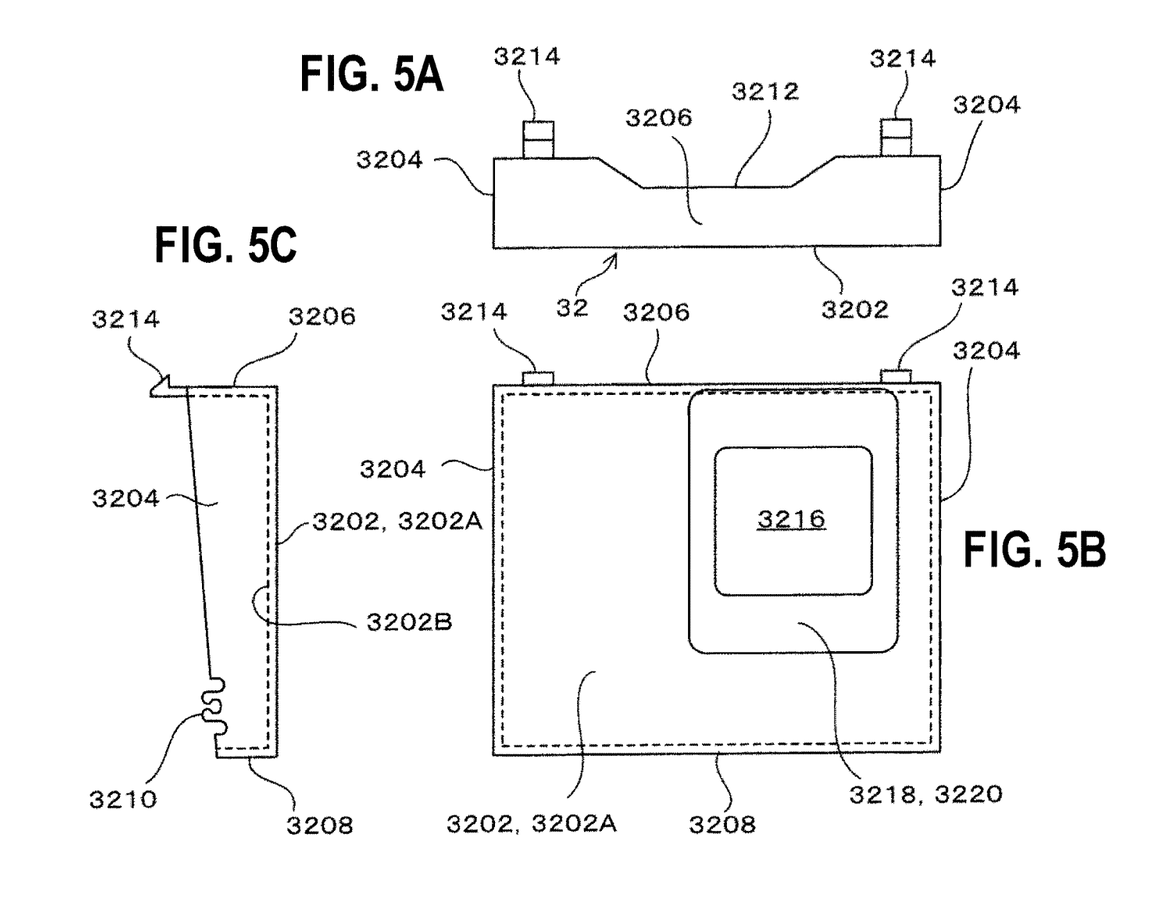
FIG. 5A is a front view of the cover.
FIG. 5B is a plan view of the cover.
FIG. 5C is a side view of the cover.

As illustrated in FIGS. 5A to 5C, the cover 32 includes a main body wall 3202 opposed to the surface 2602 of the frame 26, side walls 3204 on both sides, a rear wall 3206, and a front wall 3208.

The main body wall 3202 is formed so that at least a part for covering the operating surface 2802 of the emergency notification switch 28 has transparency and the operating surface 2802 of the emergency notification switch 28 can be visually recognized at the closed position Pc of the cover 32.

Figure 3A:
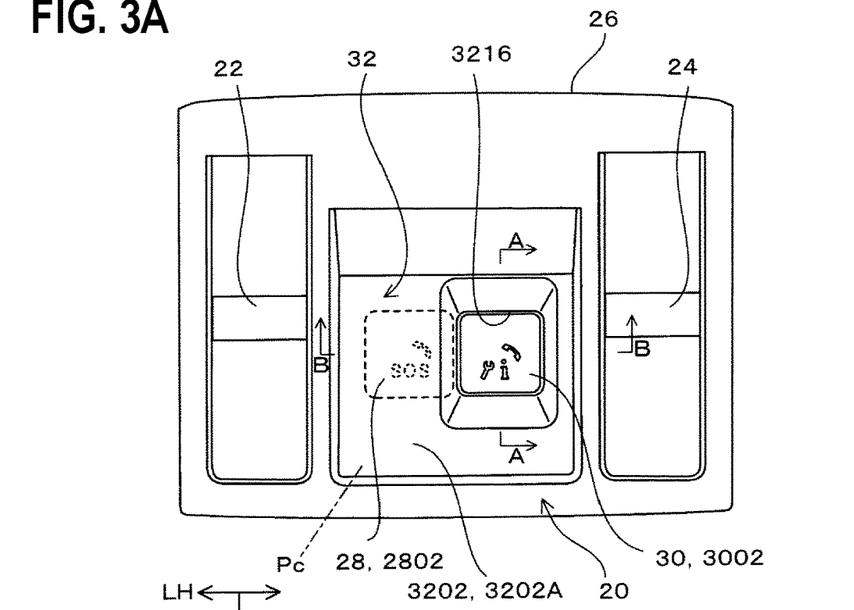
FIG. 3A illustrates a state in which the cover is at the closed position and FIG. 3B illustrates a state in which the cover is at the open position.

In the present embodiment, as illustrated in FIG. 3A, the entire main body wall 3202 has transparency, and the entire cover 32 including the main body wall 3202 is formed of a transparent member.

As illustrated in FIGS. 5A to 5C, the side walls 3204 on both sides are provided to protrude from both sides in the vehicle width direction of the main body wall 3202. The side walls 3204 on both sides abut on the surface 2602 of the frame 26 at the closed position Pc of the cover 32.

The rear wall 3206 is bent from the main body wall 3202 and connects the ends of the side wall 3204 on the vehicle rear side.

The front wall 3208 is bent from the main body wall 3202 and connects the ends of the side wall 3204 on the vehicle front side, and the front wall 3208 abuts against the surface 2602 of the frame 26 at the closed position Pc of the cover 32.

A pair of engaging claws 3210 swingably coupled to a pivot shaft (not illustrated) of the frame 26 are provided at the rear end of the side walls 3204 on both sides. It should be noted that this pivot shaft (not illustrated) is a point serving as a swinging pivot point of the cover 32.

A notch 3212 for performing the opening operation of the cover 32 is formed in the front wall 3208. Further, on the opposite sides of the notch 3212 in the vehicle width direction, a claw 3214 coupled to the engaging holes 2606 (FIGS. 2B and 3B) of the frame 26 in an attachable and detachable manner is provided, and when the claw 3214 is engaged with the engaging hole 2606, the closed state of the cover 32 is maintained.

In the open state of the cover 32, the cover 32 is suspended downward from a pivot shaft (not illustrated), and the cover 32 is maintained in the open state by its own weight.

The main body wall 3202 is provided with an opening 3216 for exposing the operating surface 3002 of the road service switch 30 inside the passenger compartment 16 at the closed position Pc of the cover 32.

The opening 3216 is formed as a rectangle outline slightly larger than the operating surface 3002 of the road service switch 30.

As illustrated in FIGS. 6A and 6B, the main body wall 3202 has a front side 3202A facing the interior of the passenger compartment 16 at the closed position Pc of the cover 32 and a back side 3202B located opposite to the front side 3202A.

A portion of the surface 3202A of the main body wall 3202 around the opening 3216 is formed by an inclined surface 3218 which approaches the back side 3202B as it approaches the opening 3216.

In the present embodiment, the portion of the main body wall 3202 around the opening 3216 is formed by an inclined wall 3220 which approaches the lower surface as it approaches the opening 3216, and the inclined surface 3218 is formed by the surface of the inclined wall 3220.

The inclination of the inclined surface 3218 (FIG. 6A) located in the front and rear parts of the opening 3216 is formed to be gentler than the inclination of the inclined surface 3218 (FIG. 6B) located on both sides in the vehicle width direction of the opening 3216, and the pushing operation of the operating surface 3002 of the road service switch 30 from the driver's seat 14 is easily performed.

The operating surface 3002 of the road service switch 30 is exposed in the opening 3216 at the closed position Pc of the cover 32. At the initial position of the road service switch 30, the operating surface 3002 is located at a portion recessed from the front side 3202A of the main body wall 3202.

Figure 7:
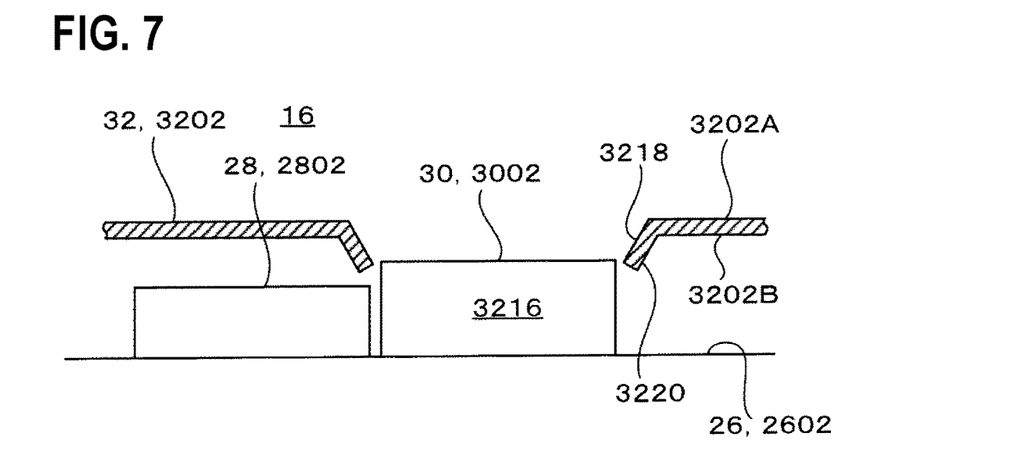
FIG. 7 is a cross-sectional view illustrating a state in which a road service switch is located at an operating position, and corresponds to FIG. 6B.

Further, as illustrated in FIG. 7, when the operating service surface 3002 of the road service switch 30 is pressed and the road service switch 30 reaches the operating position, the operating surface 3002 is located at substantially the same height as the edge and the opening edge of the main body wall 3202 (inclined wall 3220) of the opening 3216, specifically, the operating surface 3002 is located at substantially the same height as the front end of the inclined wall 3220. When pressing the operating surface 3002 of the road service switch 30 at the initial position, it is possible to smoothly perform the pressing operation at the operation position without the finger entering the inside of the cover 32.

Next, the function and effect will be described.

As illustrated in FIGS. 2A and 3A, at the closed position Pc of the cover 32, the operating surface 2802 of the emergency notification switch 28 is covered with the main body wall 3202 of the cover 32, the operating surface 3002 of the road service switch 30 is exposed from the opening 3216.

When a failure or the like occurs in the vehicle and the provision of the road service is required, the user operates the road service switch 30.

When operating the road service switch 30, the user can easily hit the fingertip on the operating surface 3002 of the road service switch 30 exposed from the opening 3216, by moving the fingertip along the surface 3202A of the main body wall 3202.

Therefore, it is possible to certainly press the operating surface 3002 of the road service switch 30 without erroneously operating the emergency notification switch 28 covered with the cover 32, and it is possible to improve the operability when operating the road service switch 30 and is advantageous.

In this embodiment, as illustrated in FIGS. 6A and 6B, in a state in which the operating surface 3002 is exposed in the opening 3216, the operating surface 3002 is located at a position recessed from the front side 3202A of the main body wall 3202. Accordingly, it is possible to easily and reliably guide the fingertip to the operating surface 3002 by checking the step between the front side 3202A of the main body wall 3202 and the operating surface 3002 with the fingertip, which is advantageous in improving the operability when operating the road service switch 30.

Further, in the present embodiment, since the portion of the front side 3202A of the main body wall 3202 around the opening 3216 is formed by the inclined surface 3218 which approaches the back side 3202B as it approaches the opening 3216, the fingertip can be easily and reliably guided to the operating surface 3002, which is more advantageous in improving the operability when operating the road service switch 30.

Further, in the present embodiment, as illustrated in FIG. 7, at the operating position of the road service switch 30, the operating surface 3002 is located almost the same height as the edge and the opening edge of the main body wall 3202 around the opening 3216. Accordingly, when pressing the operating surface 3002 located at the initial position, the pressing operating from the initial position to the operating position is smoothly performed, without the fingers entering the inside of the cover 32, the opening edge, which is advantageous, and it is more advantageous in improving operability when operating the road service switch 30.

On the other hand, when a traffic accident occurs and the police vehicle or the ambulance vehicle is required to be arranged, the user hangs the notch 3212 of the cover 32 and pulls the cover 32 toward the front to open the cover 32 from the closed position Pc to the open position Po and presses the operating surface 2802 of the emergency notification switch 28.

Figure 2B:
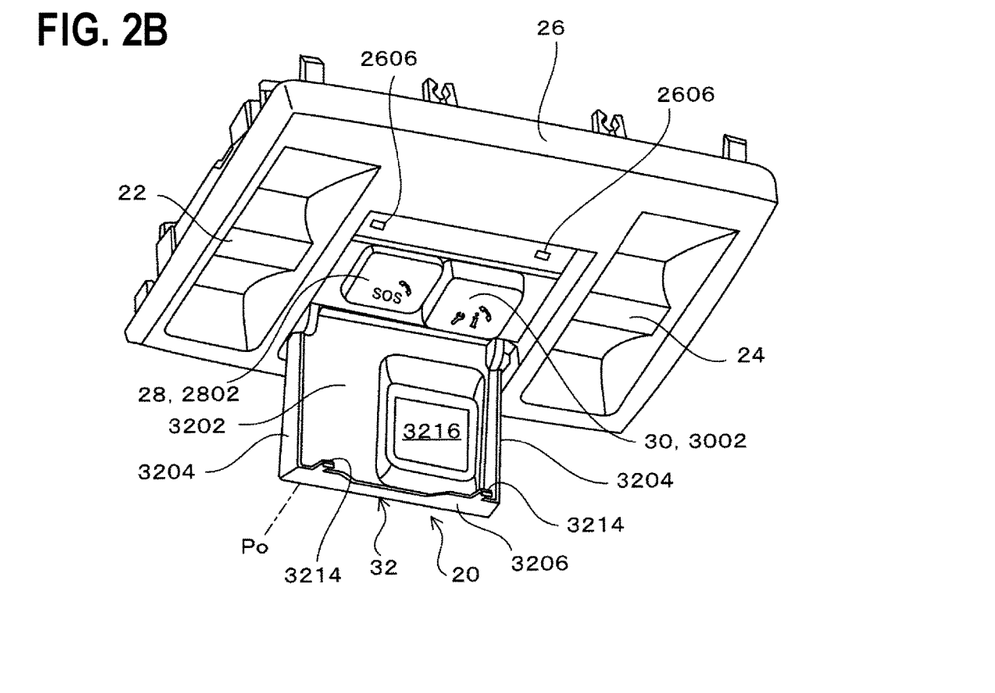
Figure 3B:
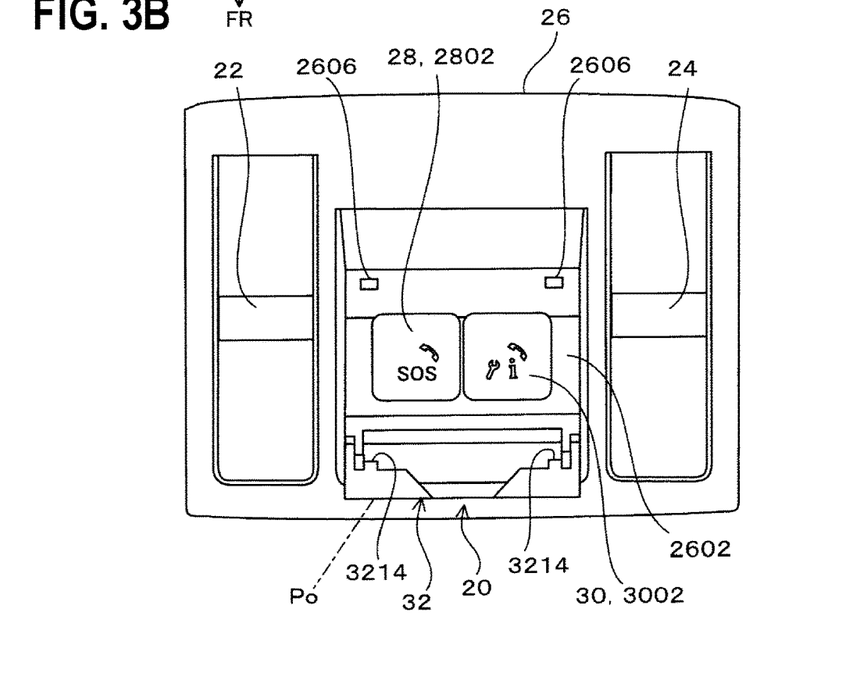

As illustrated in FIGS. 2B and 3B, at the open position Po of the cover 32, both the operating surface 2802 of the emergency notification switch 28 and the operating surface 3002 of the road service switch 30 are exposed.

At this time, as illustrated in FIG. 6B, the height h1 of the operating surface 3002 of the road service switch 30 from the surface 3202A of the frame 32 is formed to have a dimension greater than the height h2 of the operating surface 2802 of the emergency notification switch 28 from the surface 3202A. Therefore, by checking the step between the operating surface 3002 of the road service switch 30 and the operating surface 2802 of the emergency notification switch 28 with the fingertip, in other words, without visually checking the emergency notification switch 28, it is possible to easily and reliably guide the fingertip to the operating surface 2802 of the emergency notification switch 28.

In other words, at the open position Po of the cover 32, since the operating surface 2802 of the emergency notification switch 28 is located at a position lower than the operating surface 3002 of the road service switch 30, when an emergency situation such as a traffic accident occurs, even in a state in which the user is confused, by moving the fingertip on the operating surfaces 2802 and 3002, the position of the emergency notification switch 28 can be reliably grasped and pressed, which is advantageous in improving the operability at the time of operating the emergency notification switch 28.

Therefore, the emergency notification switch 28 can reliably be pressed, which is advantageous in improving the operability when operating the emergency notification switch 28.

Further, in the present embodiment, since the portion of the main body wall 3202 for covering the operating surface 2802 of the emergency notification switch 28 has transparency, as illustrated in FIG. 3A, at the closed position Pc of the cover 32, the operating surface 3002 is visually recognizable through the main body wall 3202, and it is possible to surely find the position of the emergency notification switch 28. As a consequence, the actions opening the cover 32 and operating the emergency notification switch 28 can be smoothly performed in the case where an emergency such as a traffic accident occurs.

In addition, since the main body wall 3202 of the cover 32 has transparency, it is advantageous in terms of improving the design property of the vehicle switch device 20.

In the present embodiment, the case where the vehicle switch device 20 includes one emergency notification switch 28 and one switch other than the emergency notification switch 28 has been described, but the two or more switches other than the emergency notification switch 28 may be provided.

Further, the switch other than the emergency notification switch 28 may not be the road service switch 30, but may be a switch having other functions.

In this embodiment, the case where the vehicle switch device 20 is provided on the ceiling of the passenger compartment has been described, but the vehicle switch device 20 may be located anywhere in the passenger compartment 16.

Further, the present invention is not limited to the case where the frame 26 is directed downward, but may be directed upward or sideward.

In addition, the emergency notification switch 28 and the road service switch 30 are not limited to the case where they are provided to protrude downward, but may be provided to protrude upward and sideways.

What is claimed is:

1. A switch device for a vehicle comprising:
    an emergency notification switch;
    an operation switch other than the emergency notification switch; and
    a cover that is movable between:
        a closed position at which the emergency notification switch and the operation switch are covered; and
        an open position at which the emergency notification switch and the operation switch are exposed,
    wherein an operating surface of the emergency notification switch is located at a position lower than an operating surface of the operation switch, and
    the cover is provided with an opening through which the operating surface of the operation switch is exposed at the closed position.

2. The switch device for the vehicle according to claim 1, wherein
    the cover includes a main body wall provided with the opening, and
    at least a portion of the main body wall which covers the operating surface of the emergency notification switch has transparency.

3. The switch device for the vehicle according to claim 2, wherein
    when the cover is at the closed position, the operating surface of the operation switch is located at a place recessed from a surface of the main body wall of the cover.

4. The switch device for the vehicle according to claim 3, wherein the operation switch is a push button switch which operates when the operating surface operation switch is pressed from an initial position to an operating position, and in a state where the operating surface of the operation switch is located at the operating position within the opening, the operating surface of the operation switch is located at a place further recessed from the initial position.

5. The switch device for the vehicle according to claim 3, wherein the main body wall is formed with an inclined wall extending around the opening so as to approach the operating surface of the operation switch as approaching from the main body wall to the opening.

6. The switch device for the vehicle according to claim 4, wherein the main body wall is formed with an inclined wall extending around the opening so as to approach the operating surface of the operation switch as approaching from the main body wall to the opening.

7. The switch device for the vehicle according to claim 6, wherein the operating surface is located at substantially the same height as an edge of the inclined wall in a state where the operating surface of the operation switch is located at the operating position in the opening.

* * * * *